United States Patent [19]

Tokarz

[11] 4,408,904
[45] Oct. 11, 1983

[54] TEMPERATURE PROFILE DETECTOR

[75] Inventor: Richard D. Tokarz, West Richland, Wash.

[73] Assignee: The United States of America as represented by the U.S. Department of Energy, Washington, D.C.

[21] Appl. No.: 212,310

[22] Filed: Dec. 3, 1980

[51] Int. Cl.³ .................. G01K 11/00; G01K 13/00
[52] U.S. Cl. .................................... 374/137; 338/28; 340/590; 374/160; 374/183; 376/247
[58] Field of Search ............... 73/358, 342; 340/590, 340/638, 639; 176/19 R

[56] References Cited

U.S. PATENT DOCUMENTS

| | | | |
|---|---|---|---|
| 2,587,506 | 2/1952 | Moreland | 340/590 |
| 2,750,482 | 6/1956 | Peterson | 338/26 |
| 4,058,014 | 11/1977 | Durand | 73/358 |
| 4,159,447 | 6/1979 | Gernhardt et al. | 73/358 X |

Primary Examiner—Daniel M. Yasich

[57] ABSTRACT

A temperature profile detector shown as a tubular enclosure surrounding an elongated electrical conductor having a plurality of meltable conductive segments surrounding it. Duplicative meltable segments are spaced apart from one another along the length of the enclosure. Electrical insulators surround these elements to confine molten material from the segments in bridging contact between the conductor and a second electrical conductor, which might be the confining tube. The location and rate of growth of the resulting short circuits between the two conductors can be monitored by measuring changes in electrical resistance between terminals at both ends of the two conductors. Additional conductors and separate sets of meltable segments operational at differing temperatures can be monitored simultaneously for measuring different temperature profiles.

8 Claims, 8 Drawing Figures

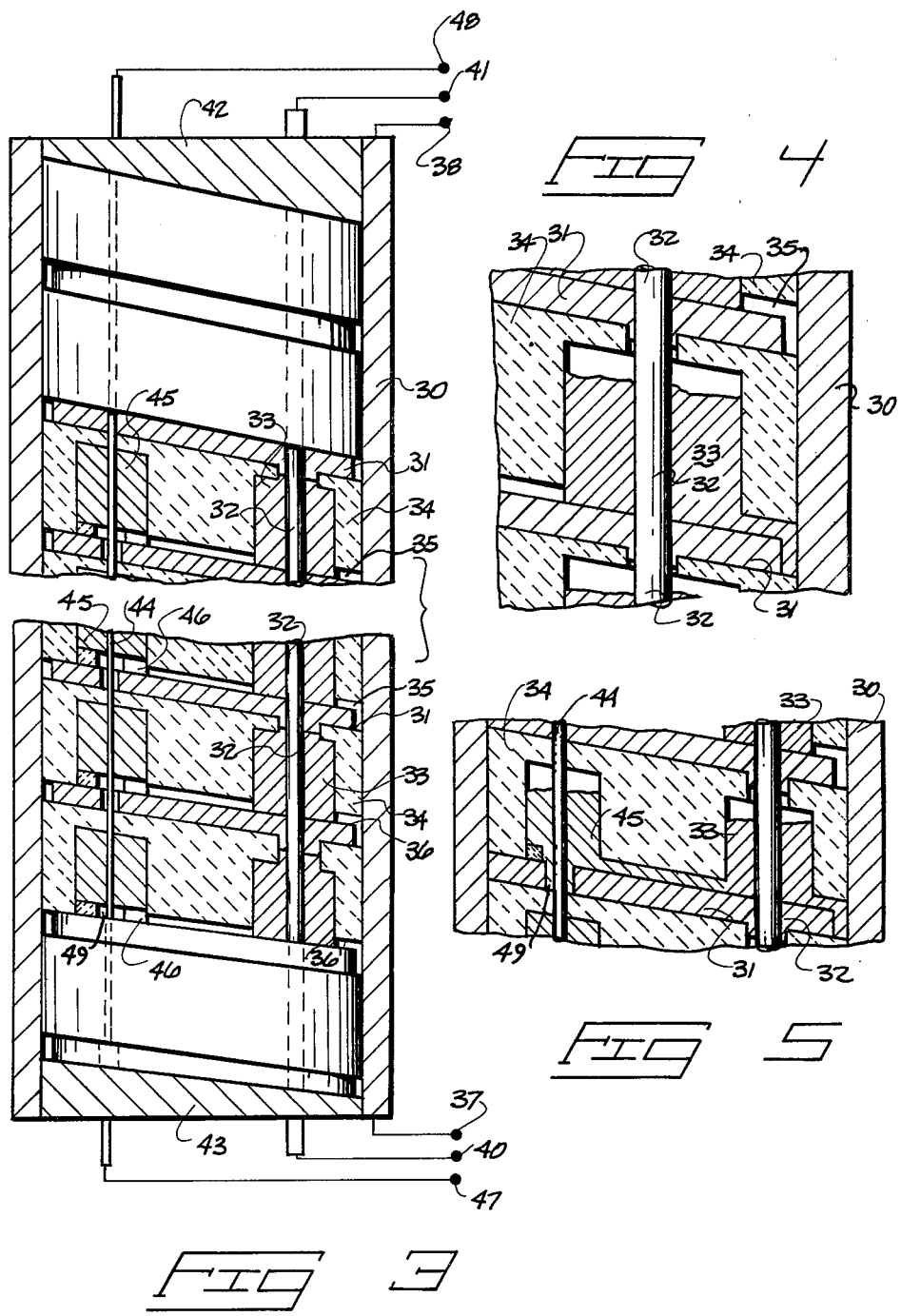

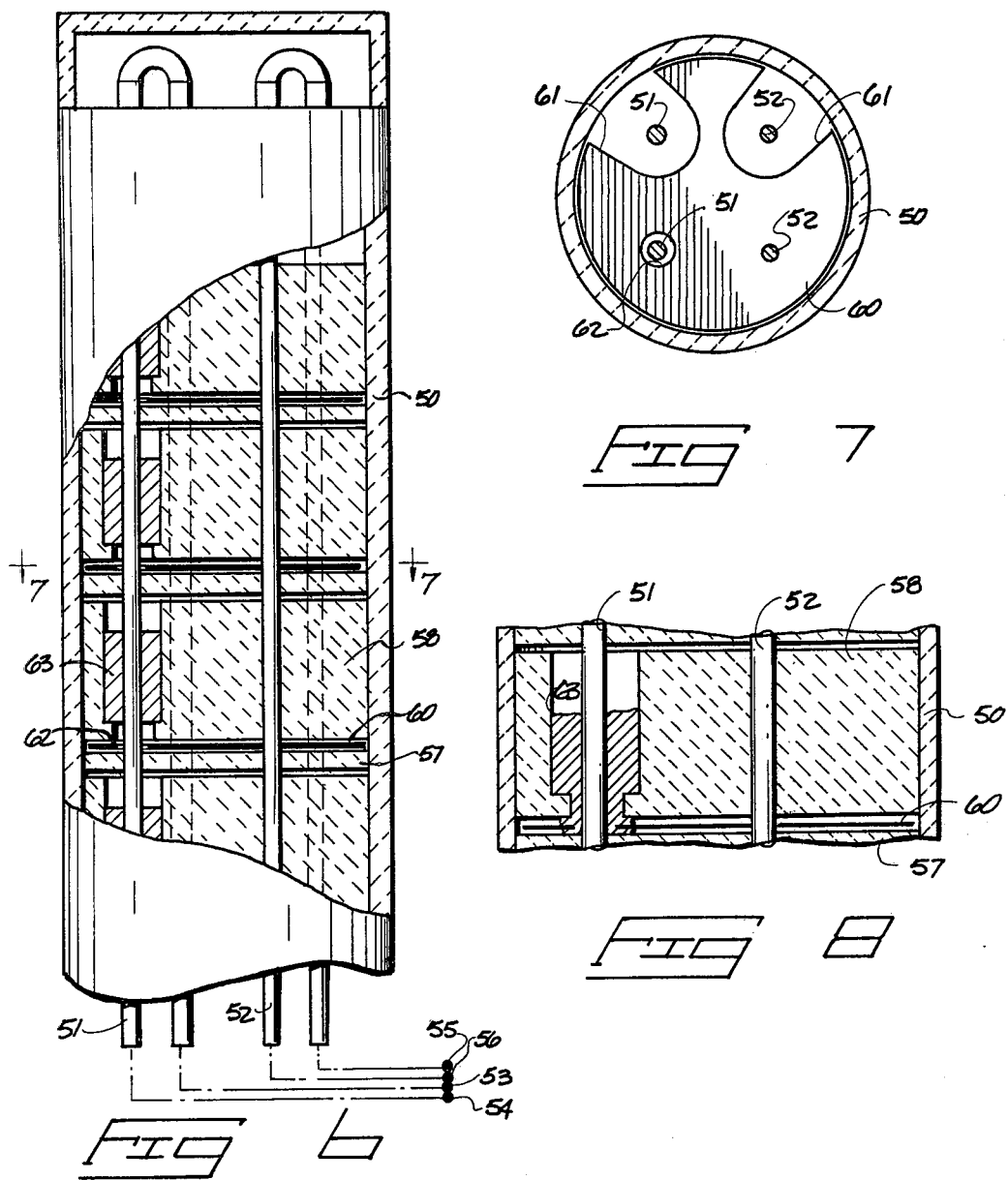

TEMPERATURE PROFILE DETECTOR

The United States Government has rights in this invention pursuant to Contract No. EY-76-C-06-1830 between the U.S. Department of Energy and Battelle Memorial Institute.

BACKGROUND OF THE INVENTION

This disclosure relates to a temperature detector for determining the physical profile of temperature rises to a predetermined temperature. It is capable of providing a physical profile of temperature rises spreading through an adjacent heated element.

This invention arose from tests requiring measurement of selected operational parameters within nuclear fuel bundles. It meets projected fuel bundle instrumentation requirements for development of peak temperature profiles along the length of a fuel bundle. This is desirable in the design, testing and use of the fuel bundle in order to provide a temperature profile at temperatures approaching that at which fuel rod meltdown would occur. Such measurements can be accomplished conventionally by the use of multiple thermocouples, but their costs and electrical connector requirements make such use prohibitive in actual practice.

The present device utilizes two or more elongated electrical conductors encased so as to be positionable immediately alongside fuel rods or other elongated elements. It includes a plurality of meltable metal segments spaced apart from one another along one electrical conductor. The preselected melting point of these segments determines the operational temperature monitored by the device. Electrical insulators are mounted on the conductors for separably supporting molten material from the individual meltable segments in locations electrically bridging the conductors. The changes in resistance between the two conductors that results from such bridging can be monitored and measured from both ends of both conductors to provide a temperature profile indicating the spread of the preselected temperature in the device.

SUMMARY OF THE INVENTION

The disclosed equipment includes two or more elongated electrical conductors spaced apart from one another and arranged in parallel side by side or concentric positions. The length of each conductor overlaps at least a portion of the length of the other. A plurality of meltable segments are spaced apart from one another along the length of one conductor in positions physically separated from the other. Each segment is identically fabricated from electrically conductive material having a preselected melting point below the melting points of the conductors. Electrical insulators mounted along the conductors separately confine molten material that flows from the respective segments so as to position the molten material in bridging contact between the conductors at predetermined locations along their lengths. Temperature profiles are therefore attainable by monitoring changes in resistance between terminals at opposite ends of the conductors.

It is an object of this invention to provide a relatively inexpensive detector for monitoring the physical spread of peak temperatures along an elongated member without the use of expensive multiple thermocouples.

Another object of the invention is to provide an encased device for temperature profile detection which is capable of being used at extremely high temperatures without itself contaminating adjacent equipment.

DESCRIPTION OF THE DRAWINGS

FIG. 3 is a view similar to FIG. 1, showing a second form of the invention;

FIG. 4 is a view of one assembly as shown in FIG. 3, illustrating bridging at a first temperature rise;

FIG. 5 is a view similar to FIG. 4 illustrating bridging after a second temperature rise;

FIG. 6 is a fragmentary view showing a third form of the invention;

FIG. 7 is a sectional view taken along line 7—7 in FIG. 6; and

FIG. 8 is a view similar to FIG. 6, illustrating bridging of the conductors.

DESCRIPTION OF THE PREFERRED EMBODIMENTS

Figures 1, 2:
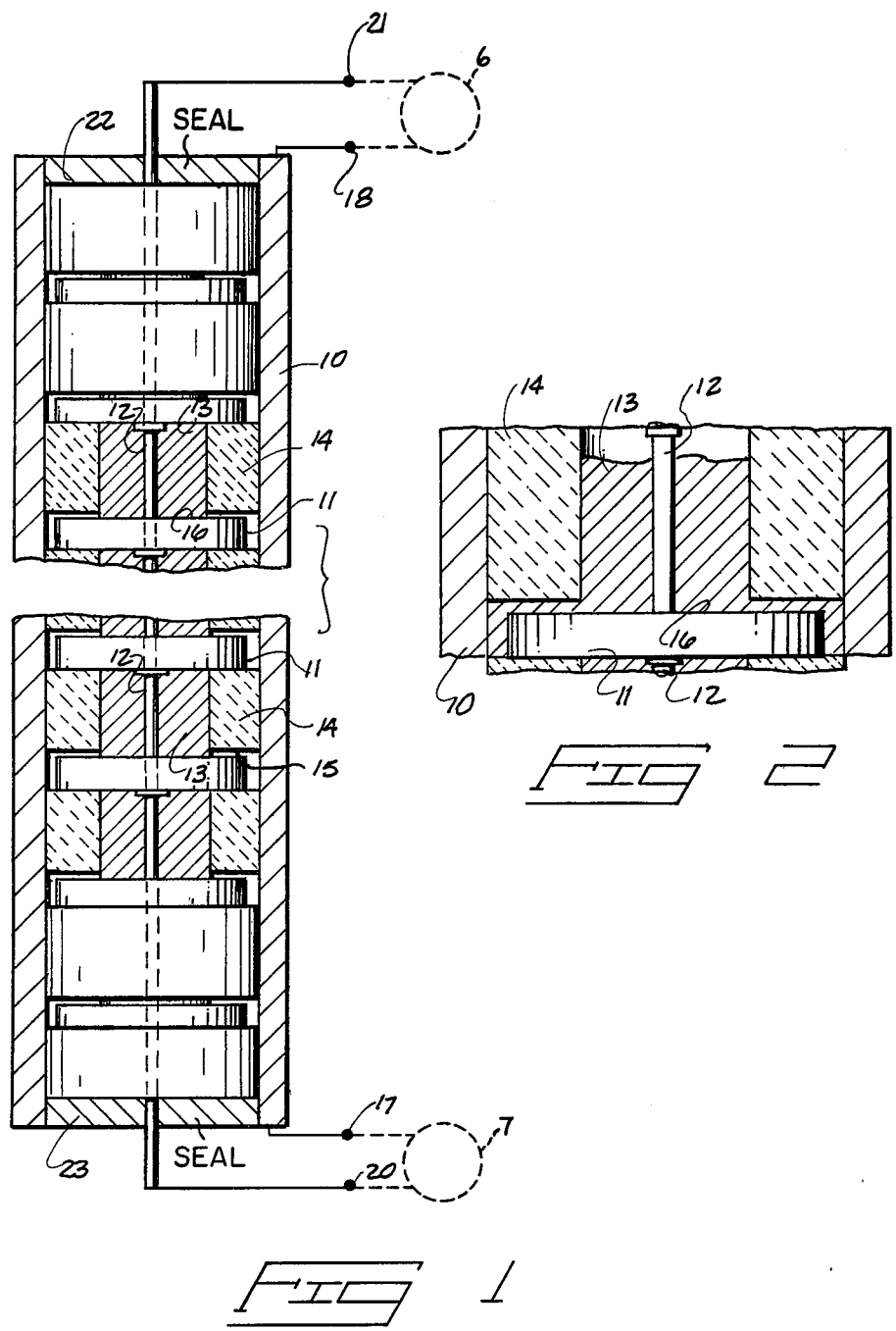
FIG. 1 is a fragmentary sectional view through a first form of the detector with certain of the assemblies being shown in section through their center line.
FIG. 2 is a cross-sectional view through one of the assemblies shown in FIG. 1, illustrating bridging of the conductors.

The temperature profile detector is illustrated in three specific embodiments shown respectively in FIGS. 1 and 2, in FIGS. 3 through 5, and in FIGS. 6 through 8. FIGS. 1 and 2 illustrate the basic structure, including two electrical conductors through which temperature rises can be monitored and a single set of meltable segments for selectively bridging portions of the two conductors. FIGS. 3 through 5 show a more complex detector capable of providing two discrete temperature profiles simultaneously. It includes three conductors and two separate sets of meltable conductive segments for selectively bridging the conductors. FIGS. 6 through 8 show a detector with a ceramic casing that is electrically nonconductive. Obviously, many physical and design modifications can be accomplished within the general discussion of the apparatus as follows.

Referring to FIG. 1, the apparatus illustrated includes a first elongated electrical conductor shown as a cylindrical metal tube 10. The tube 10 has concentric cylindrical inner and outer walls. The melting point of the material from which tube 10 is fabricated is at a level above that which is to be monitored.

The detector also includes a second elongated electrical conductor shown as a plurality of stacked metal disks 11 each having an integral metal extension 12. They also are fabricated from a metal having a melting point above that which is to be detected by the apparatus. The second conductor is arranged concentrically within the first. It is physically separated from the first conductor and arranged generally parallel to it along the center axis of the assembly.

As shown in FIG. 1, the length of the second conductor (disks 11 and extensions 12) overlaps at least a portion of the length of the first conductor (tube 10). The second conductor is enveloped within the first conductor as a sealed and fully enclosed unit. Appropriate seals 22 and 23 enclose the interior of the tube 10 to physically isolate the interior of the apparatus from the surrounding environment in which it is to be used.

Surrounding each of the metal extensions 12 is a meltable segment 13. Each segment 13 is identical. They are fabricated from electrically conductive material, such as a metal or alloy. Each segment 13 has a common preselected melting point below the melting points of the first and second electrical conductors. The melting point of segments 13 defines the monitored temperature at which the detector is operational. By proper choice of metal alloys for the conductors and segments 13, either very low temperatures (150° F.) or very high temperatures (5000° F.) can be monitored.

The meltable segments 13 are formed as cylindrical collars that concentrically surround the individual conductor extensions 12. They are spaced apart from one another along the length of the electrical conductors in positions physically separated from the interior walls of the tube 10. In their solid state, the segments 13 therefore have no effect on measured resistance between the two electrical conductors.

Electrical insulators 14 are mounted along the electrical conductors to maintain the initial separation between segments 13 and tube 10 and for separably supporting molten material from the individual segments 13 in bridging contact between tube 10 and an associated disk 11. This physical confinement of the molten metal material assures that bridging contact effected by each segment 13 will be accomplished at identically spaced locations along the lengths of the two conductors.

The insulators 14 basically comprise cylindrical collars of ceramic material or other non-conducting substances that encircle the individual segments 13. They preferably include radial surface channels 15 which extend along a surface of each disk 11 and which serve to channel the flow of molten metal and confine its location in conjunction with the adjacent surface 16 of a successive insulator. Such confinement and the resulting bridging of conductors is illustrated in FIG. 2.

Tube 10 is provided with electrical terminals 17 and 18 at its respective ends. Terminals 20 and 21 are provided at the opposite ends of the extensions interconnecting the disks 11 of the interior or second conductor. These four terminals 17, 18, 20 and 21 can be connected to resistance monitoring equipment 6 and 7. By measuring resistance between the two conductors from two directions, an indication of the location at which a short circuit has occurred due to melting of one or more segments 13 can be readily obtained. The melting of successive segments 13 will cause an apparent short circuit that will travel along the length of tube 10. The change in measured resistance will be directly proportional to the temperature profile. As the elevated temperature spreads, the resulting temperature profile available from such resistance measurements will indicate the direction and location of such changes from the initial starting point. The output of the two readout systems available from the detector will accurately reflect temperature growth within adjacent equipment, such as a fuel bundle in a nuclear reactor test.

This detector provides a one time readout and will not recover. However, the detector can be readily replaced if future testing of the same equipment requires successive temperature profiles.

FIGS. 3 through 5 illustrate a form of the detector having the same basic configuration, but including a third conductor and second set of meltable segments. It is capable of providing two discrete temperature profiles simultaneously.

The exterior metal tube 30 shown in FIG. 3 would typically have a cylindrical cross section, but other cross-sectional configurations can be substituted when desired. As in the first embodiment, tube 30 serves as a first conductor.

The second conductor shown in this embodiment comprises a plurality of stacked disks 31 with integral metal extensions 32 similar to those previously described, although the extensions 32 are not concentric with the walls of tube 30. They are offset to one side of the cylindrical axis of the tube 30. A first set of meltable segments 33 is shown as a series of collars surrounding the individual extensions 32. These in turn are surrounded by ceramic electrical insulators 34 which include channels 35 adjacent each disk surface. The insulators 34 and channels 35 provide open spaces in which molten metal from the individual segments 33 can electrically bridge the interior wall of tube 30 and an individual disk 31 by confining it along an adjacent surface 36 of a successive insulator 34. (See FIG. 4).

Measurement of a second temperature profile is accomplished by inclusion of a third conductor shown as a metal rod 44. Rod 44 extends through the length of tube 30 and is physically spaced apart from both the interior walls of tube 30 and from the disks 31 of the second conductor. A second set of meltable segments 45 surrounds rod 44 within each insulator 34. As with the first set of meltable segments, the second set includes individual elements spaced apart from one another along rod 44 in positions physically separated from the walls of tube 30 as well as from the disks 31. The separation of segments 45 from the disks 31 is accomplished by the provision of interposed washers 46, which might be fabricated from a suitable high temperature ceramic material that is electrically nonconducting.

The segments 45 are identical to one another and fabricated from electrically conductive material (metal or alloy) having a prescribed melting point below those of the three conductors but above that of the first group of segments 31. The melting of segments 45 therefore signals attainment of a second preselected temperature in addition to that signalled by the melting of segments 31.

Terminals 37 and 38 are provided at the ends of tube 10. Terminals 40 and 41 are provided at the respective ends of the extensions 32 as part of the second conductor. Terminals 47 and 48 are provided at the respective ends of rod 44, which serves as the third electrical conductor in this assembly. By monitoring the resistance between the electrical terminals at the respective ends of the three conductors, one can simultaneously monitor the spread of two separate temperature rises along their lengths.

The respective ends of tube 30 are illustrated as being enclosed by seals shown at 42 and 43. These envelop the interior of the apparatus to isolate it and prevent contamination of the environment about it.

Another feature illustrated in the embodiment shown in FIGS. 3 through 5 relates to slanting of the transverse surfaces across the various members that form each temperature responsive sub-assembly. The slanting surfaces, when the detector is used in a vertical position, assure that molten metal from segments 33 and 45 will flow toward one side of tube 30. This provides more accurate confinement of the molten material and assures electrical bridging by even smaller molten masses.

FIG. 4 illustrates the operation of one detector assembly upon reaching the operational melting temperature of the first set of meltable segments 33. The molten metal will flow through the adjacent channel 35 of the surrounding insulator 34 and thereby electrically bridge the conductive inner surface of tube 30 to the adjacent extremities of the associated disk 31. If a further temperature rise occurs, the second segment 45 will subsequently melt and flow through a confining channel 49 leading between rod 44 and the associated disk 31 as shown in FIG. 5. This will form an effective short circuit between the second and third conductors, which can be monitored independently of the simultaneously occurring short circuits occurring between the first and second conductors.

Obviously, further conductors can be provided in an assembly designed to detect and monitor temperature profiles at successive temperature rises.

FIGS. 6 through 8 illustrate general details of a third form of the apparatus, illustrating the manner by which the basic structure can be incorporated within an outer case that is electrically nonconductive and inert to corrosive or other hazardous environments. It also shows an alternative arrangement of the conductors in which their terminals are accessed through a common end of the assembly.

As shown in FIG. 6, the detector includes a sealed ceramic outer case or tube 50 which encloses two looped conductors 51 and 52. The respective ends of conductor 51 are electrically connected to terminals 53 and 54. The ends of conductor 52 are connected to terminals 55 and 56. Changes in resistance at these terminals are monitored and evaluated as previously described.

Stacked along the length of the conductors 51 and 52 within the confines of tube 50 are a series of insulating ceramic washers 57 and insulating ceramic spacers 58. Interposed between each washer 57 and spacer 58 is a metal conductive plate shown at 60 (FIG. 7). The plate 60 is basically circular in shape, and has a size complementary to the interior of the tube 50. However, each plate 60 has two large recesses 61 which space it from one leg of each conductor 51 and 52. In addition, an enlarged aperture 62 surrounds the remaining leg of conductor 51. The remaining leg of conductor 52 is in physical contact with plate 60, so that plate 60 is a transverse extension of one leg of the conductor 52.

The ceramic spacers 58 each include an opening located immediately above the respective apertures 62 within each plate 60. Positioned within each opening is a cylindrical segment 63 of a meltable electrically conductive material as generally described previously. The segments 63 surround the conductor 51, but are physically spaced and insulated from both plate 60 and conductor 52.

As shown in FIG. 8, when melting of the segment 63 occurs, the molten material will flow gravitationally downward and bridge the physical gap presented by aperture 62, thereby shorting the two conductors. Minor modifications to the design will allow its use in the horizontal position. Again, this electrical short can be used as an effective indication of both temperature attainment and its progressive spread along the length of the assembly.

The above embodiments illustrate typical physical forms of the basic apparatus. The detector is capable of being designed in extremely small dimensional sizes so as to be readily interspersed in very confined conditions such as would be encountered in conventional nuclear fuel bundles. As an example, the detector might be several feet long, but can be constructed with a diameter of no more than 1/8" in order to meet existing physical requirements in such installations. Small electrical gaps and small quantities of molten liquid will achieve the results described above.

Having described my invention, I claim:

1. A temperature profile detector, comprising:
    a first elongated electrical conductor means;
    a second elongated electrical conductor means spaced from and parallel to the first conductor means, the length of said second
    conductor means overlapping at least a portion of the length of said first conductor means;
    a plurality of meltable segments spaced apart from one another along the length of one of said conductor means and in electrical contact with said conductor means in positions physically separated from the remaining conductor means, each segment being fabricated from electrically conductive material having a preselected melting point below those of said both conductor means;
    and electrical insulator means comprising a plurality of ceramic elements stacked along said both conductor means in bridging contact between said both conductor means at spaced locations along their lengths, each element including at least one defined channel for confining molten metal from an associated segment in such bridging contact.

2. A temperature profile detector as claimed in claim 1 wherein one of said conductor means includes transverse conductive members protruding toward the remaining conductor means.

3. A temperature profile detector as claimed in claim 1 wherein the first conductor means is a length of metal tubing enclosing said second conductor means.

4. A temperature profile detector as claimed in claim 1 wherein the first conductor means is a length of metal tubing enclosing said second conductor means;
    said second conductor means including a plurality of plates extending transverse to both its length and to said first conductor means.

5. A temperature profile detector as claimed in claim 1 wherein the first conductor means is a length of metal tubing enclosing said second conductor means;
    said second conductor means being concentrically positioned through the interior of said first conductor means and having electrically conductive terminals at opposite ends thereof.

6. A temperature profile detector as claimed in claim 1 wherein the first conductor means is a length of metal tubing enclosing said second conductor means;
    said second conductor means being concentrically positioned through the interior of said first conductor means and having electrically conductive terminals at opposite ends thereof;
    said segments being concentrically positioned about said second conductor means.

7. A temperature profile detector as claimed in claim 1 wherein the first conductor means is a length of metal tubing enclosing said second conductor means;
    said second conductor means being concentrically positioned through the interior of said first conductor means and having electrically conductive terminals at opposite ends thereof;
    said segments being concentrically positioned about said second conductor means;
    said electrical insulator means comprising a plurality of identical ceramic elements stacked along said both conductor means, each element including at least one defined channel for confining molten metal from an associated segment in such bridging contact.

8. A temperature profile detector comprising:

a first elongated electrical conductor means in the form of a length of hollow metal tubing having electrically conductive interior walls;

a second elongated electrical conductor means located within the first conductor means, said second conductor means being physically spaced from the interior walls of said conductor means, and being parallel to the first conductor means;

a plurality of meltable segments surrounding said second conductor means and spaced apart from one another along its length in positions physically separated from the interior walls of said first conductor means, each segment being identically fabricated from electrically conductive material having a prescribed melting point below those of said both conductors means;

electrical insulator means comprising a plurality of ceramic elements stacked along said both conductor means for separably supporting molten material from the respective segments in bridging contact between said both conductor means at equally spaced locations along their lengths;

a third elongated electrical conductor means located within the first conductor means, said third conductor being physically spaced apart from both the interior walls of said first conductor means, and from said second conductor means;

an additional plurality of meltable segments surrounding said third conductor means and spaced apart from one another along its length in positions physically separated from said first and second conductor means, each of said additional segments being identically fabricated from electrically conductive material having a prescribed melting point below those of the conductor means but above that of the first-named segments;

said electrical insulator means also separably supporting molten material from the respective additional segments in bridging contact between said conductor means and said third conductor means at equally spaced locations along their lengths.

* * * * *